(No Model.)
A. SHERWOOD.
PLOW AND WORK HARNESS.
No. 260,128. Patented June 27, 1882.
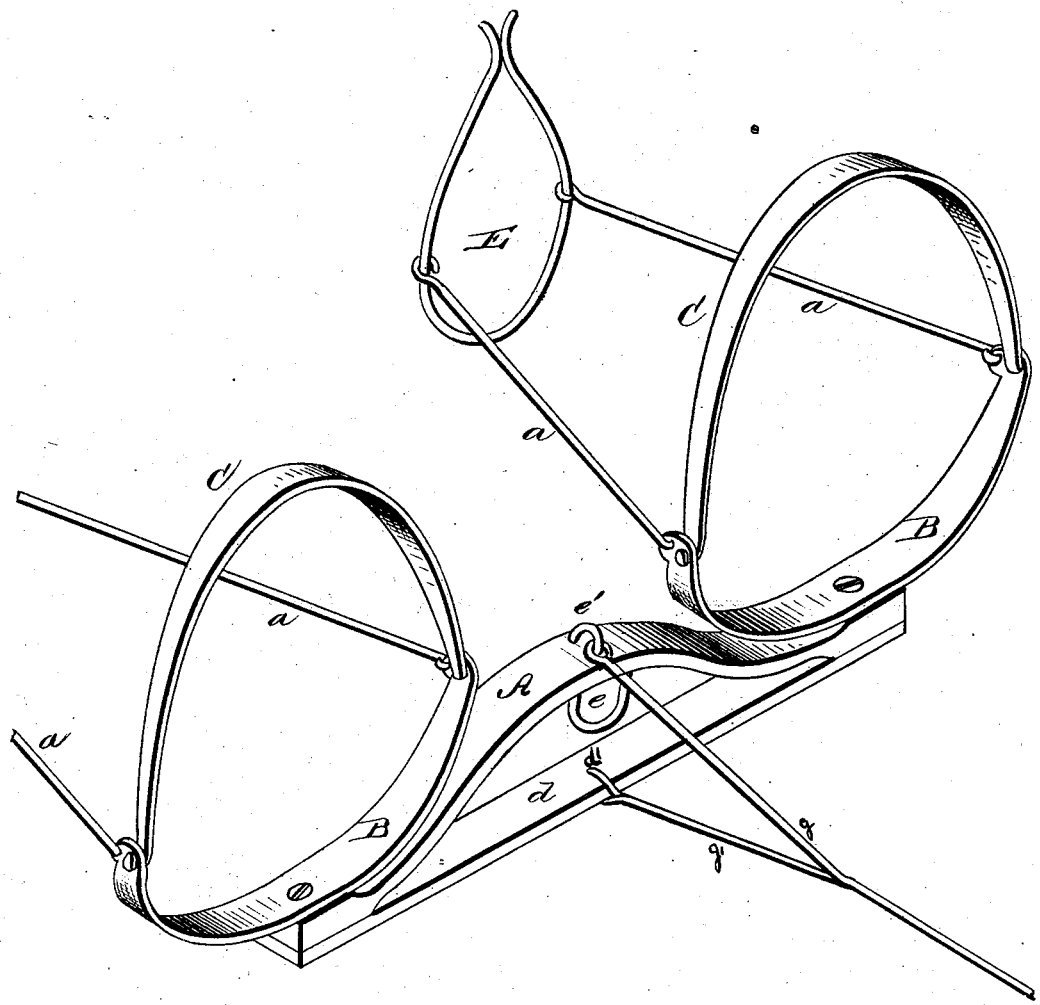
Witnesses:
Inventor.
Allen Sherwood,
per Jh. Alexander
Attorney.

United States Patent Office.

ALLEN SHERWOOD, OF AUBURN, NEW YORK.

PLOW AND WORK HARNESS.

SPECIFICATION forming part of Letters Patent No. 260,128, dated June 27, 1882.

Application filed November 12, 1881. (No model.)

*To all whom it may concern:*

Be it known that I, ALLEN SHERWOOD, of Auburn, in the county of Cayuga and State of New York, have invented certain new and useful Improvements in Plow and Work Harness; and I do hereby declare that the following is a full, clear, and exact description thereof, reference being had to the accompanying drawing, and to the letters of reference marked thereon, which forms part of this specification, in which is represented a perspective view of my harness.

The object I have in view is to provide a more simple and economical means of attaching horses to plows, wagons, &c., than now in use, and withal to obviate the several disadvantages consequent upon the present method of constructing harness for such purposes; and to these ends my invention consists essentially in the peculiar combination and arrangement of the several parts hereinafter specified, when constructed substantially as will be set forth.

To enable others skilled in the art to avail themselves of the benefits of my invention, I will now proceed to describe its construction and operation.

A represents an arched double-tree of suitable length, having an auxiliary brace, d, secured to the under side thereof.

B B represent metallic or wooden single-trees, which are curved to conform to the shape of that part of the horse just behind the fore leg, where they are intended to fit. The ends of these single-trees should extend up to only about one-half the distance to the back of the horse, and are pivoted on top of the double-tree at each of its ends, in order to admit of their adjusting themselves to the motion of the animal.

C C represent back-bands, which may be either of leather or sheet metal, though I prefer the latter. The ends of these back-bands are formed with hooks to engage with eyes in the ends of the single-trees B, so that they may be easily and quickly attached or detached.

Of course I do not confine myself to any particular kind of device for connecting these parts, as it is obvious there are a variety of means of accomplishing the object in view.

*a a* represent rods or other connections, one end of which are also secured to the single-trees, while their opposite ends are attached to the hames E, which may consist of twisted wire or other material bent to conform to the shape of the collar. The length of the rods *a a* should be sufficient to admit the bent single-trees being adjusted or fitted on the horse just in rear of his fore legs.

*e* represents a loop or staple secured at the center and on the under side of the double-tree A, by means of which the tongue of the wagon is attached to my harness.

*e'* is also a staple on top of the double-tree, and the brace *d* is supplied with a similar device or a hole, *d'*.

*g* represents either a flexible or inflexible connection, by means of which the double-tree is attached to a plow or harrow. *g'* is also a similar connection, connecting the auxiliary bar with the main rod or rope *g*, substantially as shown, for the purpose of equally dividing the draft between the double-tree and auxiliary bar, and thereby keeping said parts in proper position when in operation.

It will thus be seen that I not only much reduce the cost of the ordinary harness, but that I also save much time in hitching and unhitching.

There are many other advantages connected with my invention, which will be best appreciated by an actual and practical test of the same.

Having thus fully described my invention, what I claim as new, and desire to secure by Letters Patent, is—

1. The combination of the arched double-tree A, having auxiliary brace *d*, with single-trees B B, pivoted on top of the double-tree and adapted to oscillate on a plane parallel therewith, substantially as and for the purpose set forth.

2. The arched double-tree A, provided with the auxiliary brace *d* and staple *e*, in combination with double-trees B B, rods *a a*, connections *g g'*, and hames E E, all constructed and arranged to operate substantially as and for the purpose set forth.

In testimony that I claim the foregoing as my own I affix my signature in presence of two witnesses.

ALLEN SHERWOOD.

Witnesses:
WM. L. STOUGHTON,
E. G. BECKWITH.